United States Patent [19]

Curless

[11] Patent Number: 5,265,497
[45] Date of Patent: Nov. 30, 1993

[54] GUARD FOR OPERATOR ACCESS STATION

[75] Inventor: Richard A. Curless, Greer, S.C.

[73] Assignee: Cincinnati Milacron Inc., Cincinnati, Ohio

[21] Appl. No.: 942,006

[22] Filed: Sep. 8, 1992

[51] Int. Cl.⁵ .............................................. F16P 3/04
[52] U.S. Cl. ........................................ 74/608; 74/612;
198/346.1; 49/297; 409/134; 29/33 P
[58] Field of Search ................. 74/608, 609, 612, 613,
74/614, 615, 616; 198/346.1; 49/279, 404;
292/137, 138; 408/241 G, 710; 409/134; 29/33
P, DIG. 94

[56] References Cited

U.S. PATENT DOCUMENTS

| 4,373,406 | 2/1983 | Piotrowski | 74/613 |
| 4,673,076 | 6/1987 | Mattson | 198/346.1 X |
| 4,677,718 | 7/1987 | Babel | 74/613 X |
| 4,685,361 | 8/1987 | Myers | 74/608 X |
| 4,687,088 | 8/1987 | Babel | 192/133 |
| 4,742,609 | 5/1988 | Neumann | 74/608 X |
| 4,832,170 | 5/1989 | Takeuchi et al. | 198/346.1 |
| 4,890,716 | 1/1990 | Kitamura | 198/346.1 |
| 4,999,895 | 3/1991 | Hirose et al. | 29/33 |
| 5,099,980 | 3/1992 | Babel | 198/346.1 |
| 5,181,898 | 1/1993 | Piotrowski | 409/134 X |

FOREIGN PATENT DOCUMENTS

89/02339 3/1989 PCT Int'l Appl. ................. 409/134

OTHER PUBLICATIONS

Cincinnati Milacron brochure Publn. No. M-5287-2 SPRINT High Performance CNC Machining Center.

Primary Examiner—Leslie A. Braun
Assistant Examiner—Ryan W. Massey
Attorney, Agent, or Firm—Thomas M. Farrell

[57] ABSTRACT

A rotary deck for interchanging a pair of pallets in a machining center is partially enclosed within a guard housing surrounding the machining zone. The deck sweeps a predetermined diameter with the pallets. An operator access door is mounted to cover an opening in the housing, adjacent the machining zone. The door slides into the sweep diameter when opened and the deck is stationary; an interlock prevents deck rotation when the door is opened.

5 Claims, 4 Drawing Sheets

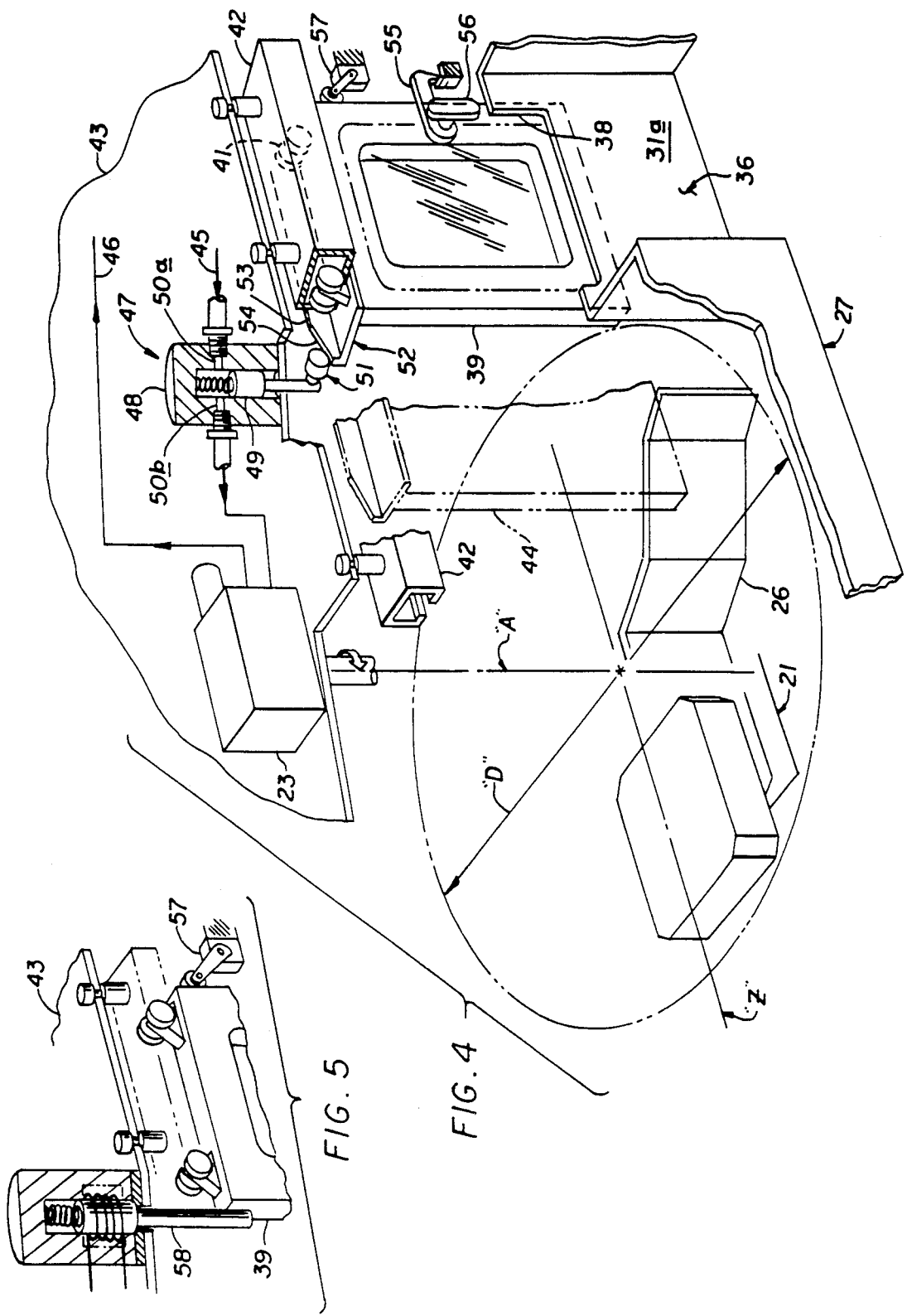

GUARD FOR OPERATOR ACCESS STATION

BACKGROUND

It is a desirable feature to have a complete guard enclosure surrounding a work chamber of a machining center, to contain chips and coolant. In production machining centers, it is frequently desirable to provide for a pallet exchanger where a first pallet supported workpiece may reside within the work chamber, while a second pallet is at an operator service station outside the work chamber. The second pallet is mounted with a new, rough workpiece, and, at the end of a machining cycle, the pallets are interchanged with one another, usually by automatic means having either a linear or rotary path.

As machines and pallets increase in size, the guard enclosure can become so large as to inhibit operator access to the work zone for purposes such as inspection and measurement at prescribed times during a machining cycle.

An access door may be placed in the guard enclosure for the operator to carry out prescribed tasks, and the present invention thus concerns itself with provision of an access door in a guard enclosure which will tend not to increase the size of a guard which provides comparable enclosure but does not have an operator access door.

SUMMARY OF THE INVENTION

The invention is shown embodied in combination with a machine tool pallet transfer system having a pair of pallet stations substantially oppositely disposed on a rotatable deck with a predetermined diameter for alternate rotation of said stations between service and machining locations, where an operator access guard comprises:

a guard base located below the deck;

a guard housing attached adjacent the guard base and substantially enclosing at least a portion of the pallet transfer system within its interior;

a guard partition attached to the pallet transfer system for rotation with the rotatable deck, the guard partition interfacing with the interior of the guard housing to effectively enclose the machining location and isolate the pallet stations from one another during machining operations; and an operator's access station located in the guard housing adjacent the machining location, the access station comprising an access door which is reciprocable at least partially within the interior of the guard housing between opened and closed positions, and at least partially within the rotation diameter of the rotatable deck when in the opened position.

BRIEF DESCRIPTION OF THE DRAWINGS

FIG. 4 perspective view, similar to FIG. 1, showing details of the operator's access door, supports, and hydraulic interlock device.

FIG. 5 is a perspective view of an alternative interlock device.

DESCRIPTION OF THE PREFERRED EMBODIMENT

Figure 1:
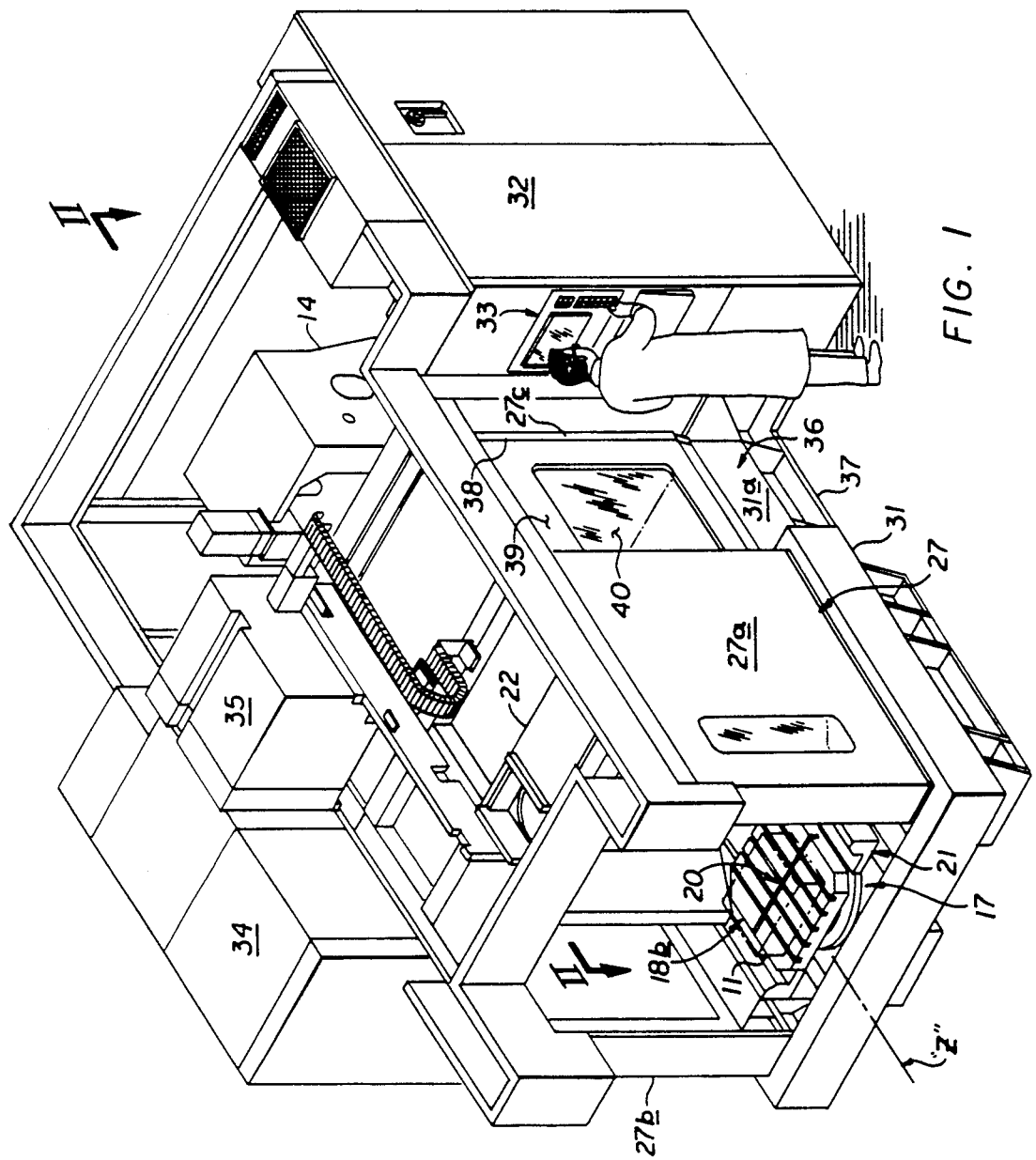
FIG. 1 is a perspective view of a machining center.

Referring to the drawings, FIG. 1 depicts a machine 10, available from Cincinnati Milacron Inc., Cincinnati, Ohio, under the trademark "MAXIM" CNC horizontal machining center, model 630. The machine 10 has a main, horizontal longitudinal axis, "Z", utilized for movement of a workpiece 11 in machining operations, and the rotary spindle axis 12 is horizontal (see FIG. 2). For convenient reference, the left end of the machine 10, as viewed in FIG. 2, may be considered to be the front.

Figure 2:
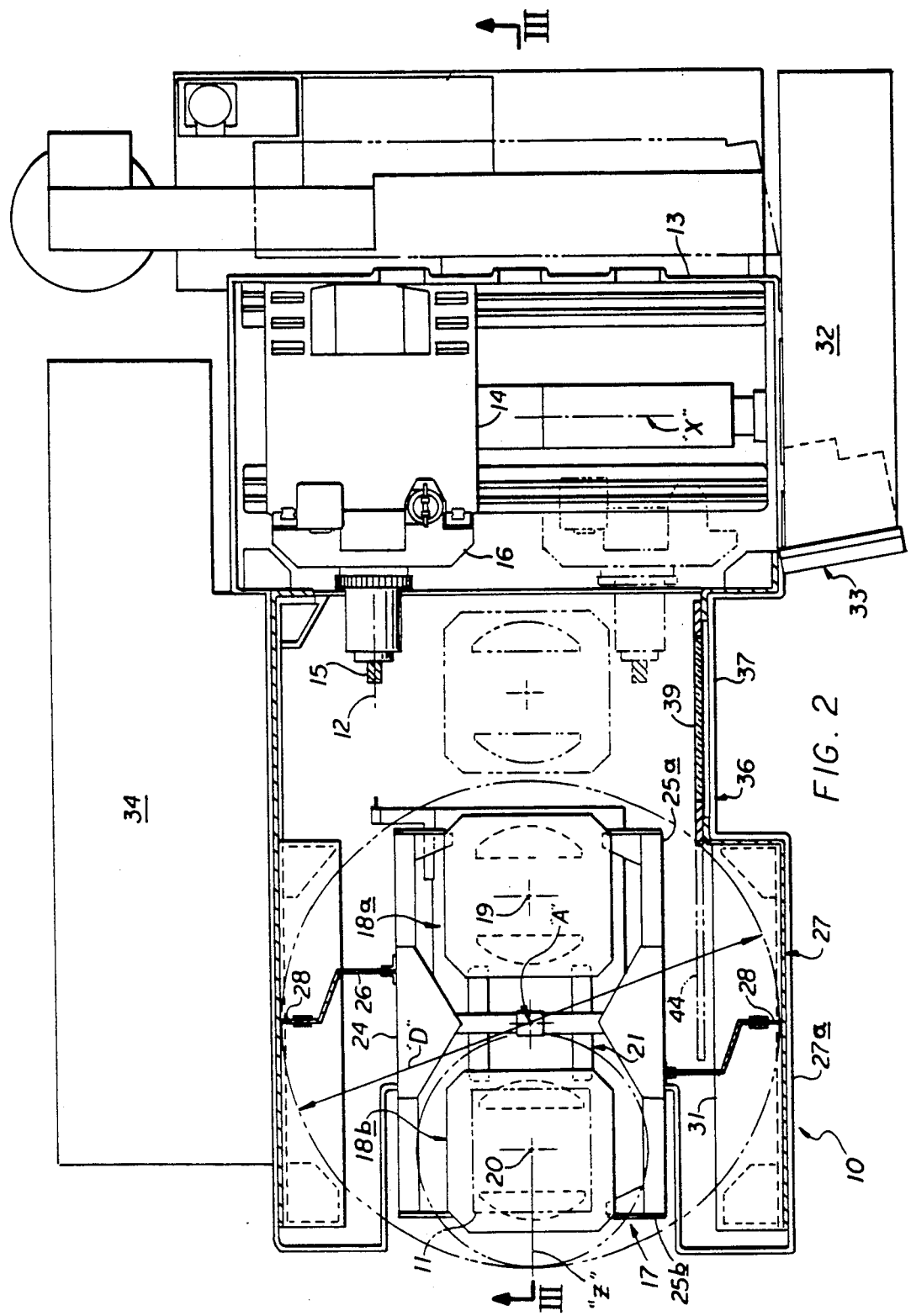
FIG. 2 is a plan view of the machining center, taken along the line II—II of FIG. 1.
Figure 3:
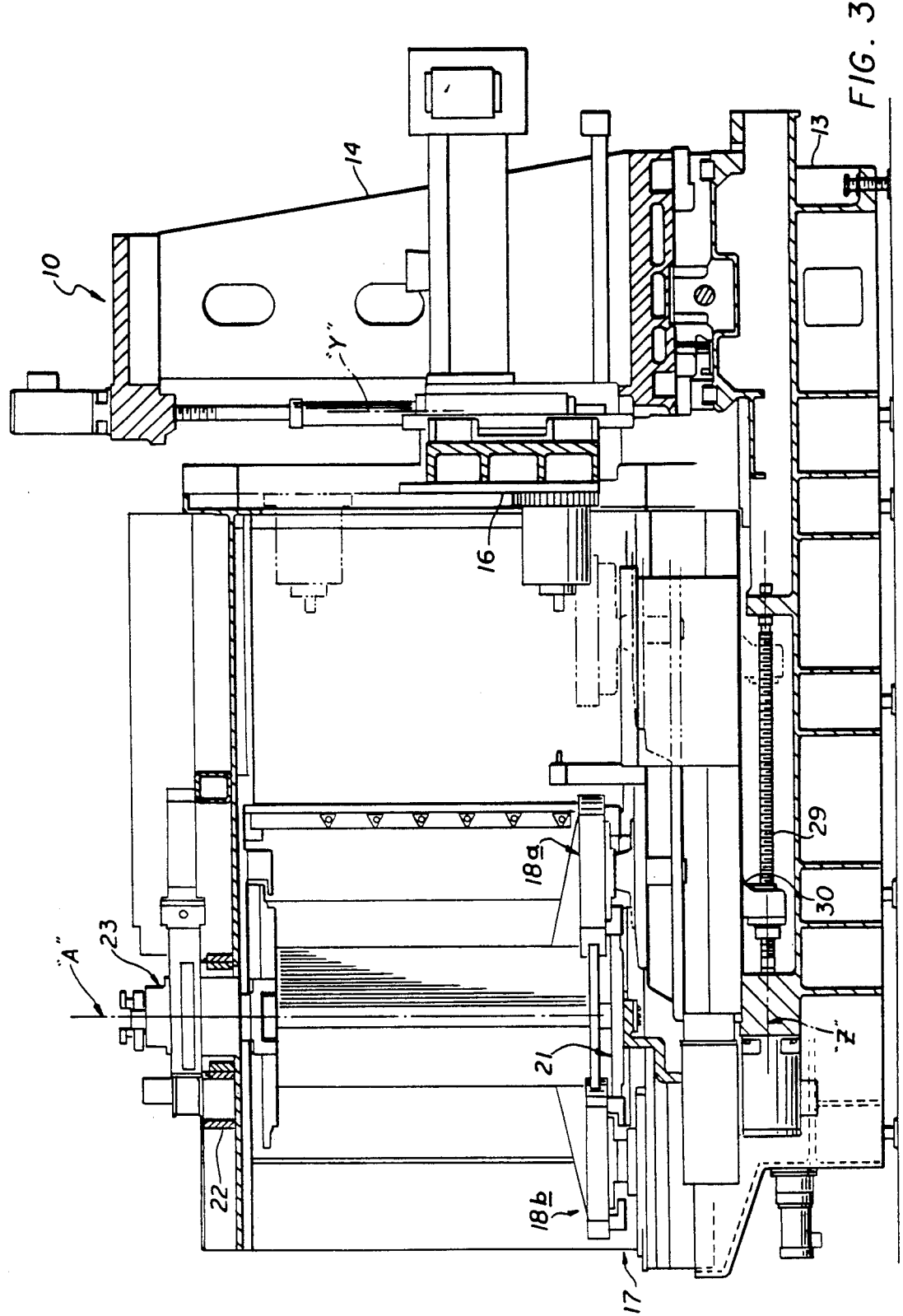
FIG. 3 is an elevational section view of the machining center, taken along the line III—III of FIG. 2.

With reference also to FIGS. 2 and 3, the machine 10 has a bed 13 which supports a slidable column 14 for tool movements along a horizontal axis, "X", and the tool 15 is rotatably supported in a spindle carrier 16 which is slidably supported on the column 14 for tool movements along a vertical axis, "Y".

The machine 10 has a pallet transfer system 17 for interchanging a pair of pallets 18a,b normally disposed along the Z-axis between a machining location 19 proximal the tool 15, and a service location 20 away from the tool 15. The pallets 18a,b are carried between the machining and service locations 19,20 by a rotatable pallet deck 21. The pallet deck 21 is supported by an overhead support 22 for rotation about a vertical axis "A". The overhead support 22 includes a rotary actuator 23 for driving the pallet deck 21, and a vertical piston (not shown) for lifting the deck 21 off locators (not shown) at index times.

The deck 21 comprises a frame 24 having two pairs 25a,b of parallel arms extending in opposite directions along the Z-axis. The deck 21 also has a guard partition 26 extending transversely across the Z-axis, spanning the inside of a guard housing 27. The partition 26 is a sheet metal fabrication with vertical rubber wipers 28 touching the housing 27, and, as the pallet deck 21 is rotated, the wipers 28 sweep through a predetermined rotation diameter, "D".

Once a pallet 18a,b moves to the machining location 19, it may be fed along the Z-axis, with respect to the tool 15, by a feed screw means 29, including a movable carrier 30, depicted in FIG. 3.

A guard base 31 below the deck 21 supports an adjacent guard housing 27. The guard housing 27 substantially encloses and isolates the working location 19 to contain chips and coolant during machining operations. The service location 20, to the front of the machine 10, is at least partly open for convenient access.

At the right side, adjacent the rear of the guard housing 27 is an electrical enclosure 32, which houses a computer numerical control 33 (CNC) which may be any of a variety of CNC's well-known in machine tool arts for controlling machine functions. The CNC 33 depicted is available from Cincinnati Milacron Inc. under the trademark "ACRAMATIC" CNC, model 950MMC. At the left side of the machine 10, adjacent the guard housing 27 is an enclosure 34 for a tool storage chain (not shown) and the tool chain is serviced by an overhead movable tool changer unit 35, not part of this invention.

The spacing of the guard housing side walls 27a,b in the region of the pallet deck 21 is at least the extent of the sweep diameter "D". At an area in front of the CNC 33, the guard base 31 has a rectangular notch 36, where the side edges 31a,37 of both the guard base and the machine bed, are parallel to the Z-axis, but moved closer to the Z-axis than the radius of the sweep diameter D. This notch 36 constitutes an operator access station. The housing wall 27c immediately above the notch 36 has an access opening 38 so an operator may reach into the working location 19 at prescribed intervals for measurement and inspection. The access opening 38 is covered by a slidable access door 39 which includes an integral window 40.

Referring to FIG. 4, the access door 39 is supported by two sets of rollers 41 carried in an overhead channel 42 secured to the roof structure 43 of the guard housing 27. The door 39 may be slid to an "opened" position 44, uncovering the access opening 38, when the pallet deck 21 is stationary. As seen also in FIG. 2, the opened door extends into the sweep diameter "D" of the deck.

The rotary actuator 23 for the deck 21 is powered by hydraulic fluid, and the actuator 23 has a pressure supply line 45 and an exhaust line 46.

In order to prevent rotation of the deck 21 when the door 39 is opened, a special hydraulic interlock device 47 is used, which has a valve body 48 attached to the roof structure 43. A plunger 49 within the valve body 48 is spring-biased to the downward position, permitting free flow between two ports 50a,b in the body 48. The actuator pressure supply line 45 is connected through the valve ports 50a,b. The bottom end of the plunger 49 is fitted with an antifriction cam roller 51. An angle bracket 52 is secured to the top of the access door 39, to present an upstanding fin 53 for actuating the plunger 49. A lead taper 54 on the fin 53 engages the roller 51 as the door 39 is opened, thus raising the plunger 49 and blocking flow through the valve body 48.

The door 39 has a latch 55 which may be manually disengaged by the door handle 56. A door switch 57 signals a "door closed" condition to the CNC 33.

It will be appreciated that other interlock devices may be substituted for the device 47 shown: For example, as depicted in FIG. 5, a solenoid-operated interlock pin 58 is provided on the roof structure 43, adjacent the door 39. The pin 58 remains in the "locked closed" position, prohibiting door movement, until the CNC 33 determines that the pallet deck 21 is stopped. At prescribed intervals in the machine control program (not shown), the pin 58 is retracted, enabling the door 39 to be opened. In order for the machining cycle to commence, the CNC 33 must receive a signal from a door switch 57 detecting that the door 39 has been slid to the fully-closed position.

While the invention has been shown and described in connection with a preferred embodiment, it is intended that the invention extends to all designs and modifications as come within the scope of the following claims.

What is claimed is:

1. In combination with a machine tool pallet transfer system having a pair of pallet stations substantially oppositely disposed on a rotatable deck with a predetermined rotation diameter for alternate rotation of said stations between service and machining locations, an operator access guard comprising:

a guard base located below said deck;
   a guard housing attached adjacent said guard base and substantially enclosing at least a portion of said pallet transfer system within its interior;
   a guard partition attached to said pallet transfer system for rotation with said rotatable deck, said guard partition interfacing with said interior of said housing to effectively enclose said machining location and isolate said pallet stations from one another during machining operations; and
   an operator's access station located in said housing adjacent said machining location, said access station comprising an access door which is reciprocable at least partially within said interior of said housing between opened and closed positions, and at least partially within said rotation diameter of said rotatable deck when in said opened position.

2. The combination of claim 1, further comprising means for preventing interference between said access door and said rotatable deck.

3. The combination of claim 2, wherein said interference preventing means comprises an interlock device which coordinates rotation of said deck and reciprocation of said access door to insure that said door is closed when rotation of said deck is desired.

4. The combination of claim 1, further comprising a machine tool arrangement wherein said machining location is situated along a longitudinal machining axis, and wherein said operator's access station further comprises a notch in said base situating said access station closer to said machining axis.

5. The combination of claim 1, wherein said access door is slidably mounted with respect to said housing, and wherein said door is located outside of said rotation diameter when in closed position and reciprocable at least partly into said rotation diameter when moved to said opened position.

* * * * *